United States Patent
Low et al.

(10) Patent No.: US 6,534,034 B1
(45) Date of Patent: Mar. 18, 2003

(54) SYNTHETIC CRYSTALLINE ALUMINOSILICATE ZEOLITE HAVING THE TSCHÖRTNERITE FRAMEWORK TOPOLOGY AND USES THEREOF

(75) Inventors: John J. Low, Schaumburg, IL (US); Gregory J. Lewis, Mt. Prospect, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/103,453

(22) Filed: Mar. 21, 2002

Related U.S. Application Data

(60) Provisional application No. 60/292,210, filed on May 18, 2001.

(51) Int. Cl.$^7$ ............................ C01B 39/02; B01D 53/02
(52) U.S. Cl. ................ 423/700; 423/700; 423/705; 95/90; 95/130; 95/902
(58) Field of Search ..................... 423/700, 705; 95/90, 130, 902

(56) References Cited

PUBLICATIONS

H. Effenberger et al. *American Mineralogist*, vol. 83, pp. 607–617 (1998).
Low, J.J., Sherman, J.D., Cheng, L.S., Patton, R.L., Gupta, A., Snurr, R.Q.; Presented at the 7$^{th}$ International Conference on Fundamental of Adsorption, Nagasaki, Japan, May 2001.

*Primary Examiner*—David Sample
(74) *Attorney, Agent, or Firm*—John G. Tolomei; Frank S. Molinaro

(57) ABSTRACT

A zeolite may be synthesized having the framework topology of tschörtnerite (TSC) and an empirical formula of $mA_{2/n}O:Al_2O_3:ySiO_2$ where A is a cation such as lithium. It is anticipated that the synthetic TSC is usable in processes for separating mixtures of molecular species. The lithium analog should be useful for air separation.

12 Claims, 1 Drawing Sheet

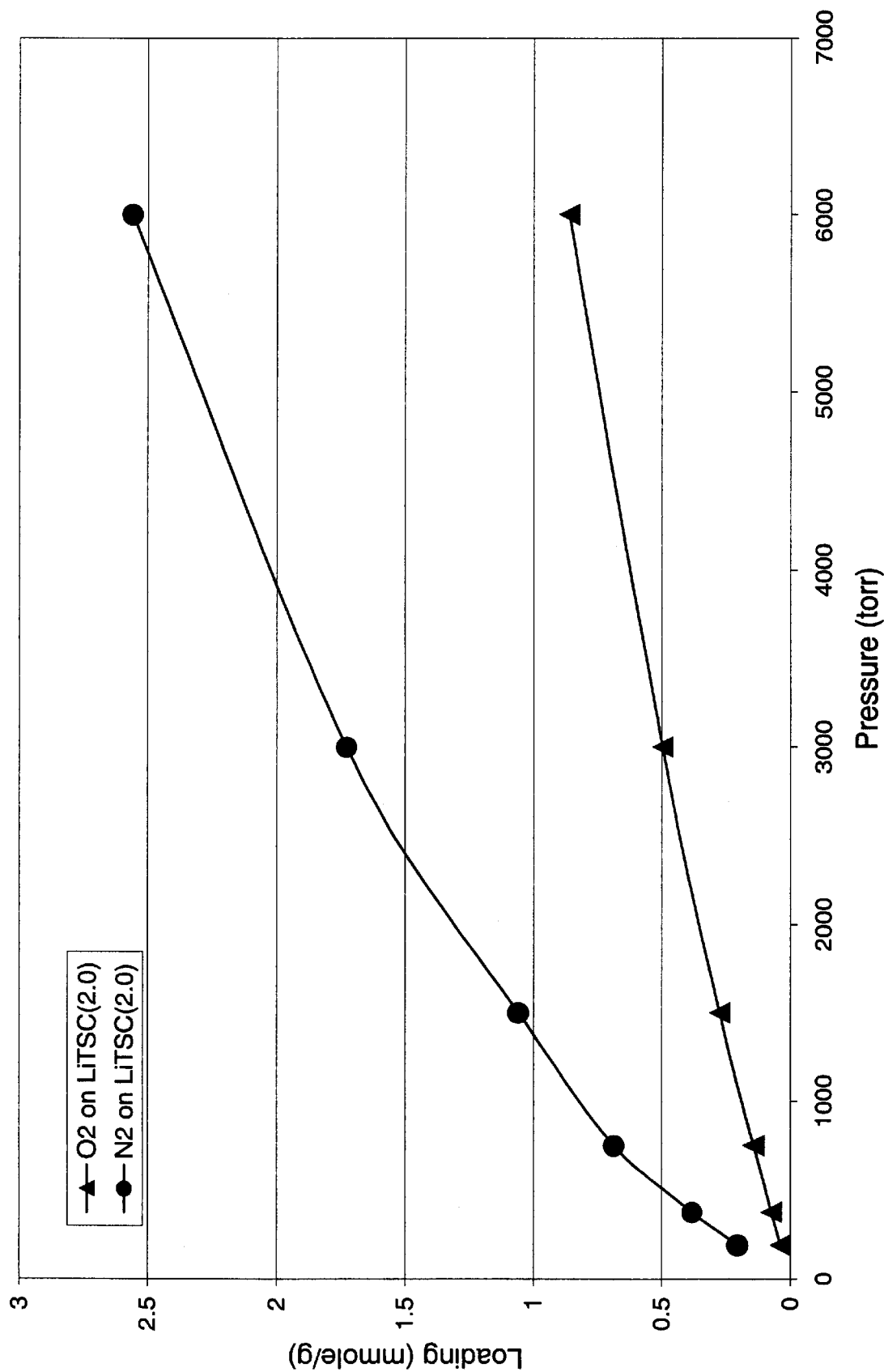

SYNTHETIC CRYSTALLINE ALUMINOSILICATE ZEOLITE HAVING THE TSCHÖRTNERITE FRAMEWORK TOPOLOGY AND USES THEREOF

This application claims the benefit of Provisional application Ser. No. 60/292,210, filed May 18, 2001.

FIELD OF THE INVENTION

This invention relates to a crystalline zeolitic material having the framework topology of tschörtnelite, an empirical formula of $mA_{2/n}O: Al_2O_3 : ySiO_2$ where A is a cation such as lithium. The invention also relates to an air separation process using the zeolite.

BACKGROUND OF THE INVENTION

Zeolites are crystalline aluminosilicate compositions which are microporous and which have a three-dimensional oxide framework formed from comer sharing $AlO_2$ and $SiO_2$ tetrahedra. Numerous zeolites, both naturally occurring and synthetically prepared are used in various industrial processes. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure.

The number of synthetic zeolites is well over a hundred as evidenced by the *Atlas of Zeolite Structure Types* published by the International Zeolite Association (IZA). As is well known, zeolites are distinguished from each other on the basis of their composition, crystal structure and adsorption properties. One method commonly used in the art to distinguish zeolites is x-ray diffraction.

A mineral discovered in 1993 in the Bellberg volcano, Eifel, Germany was found to be a new zeolite which was named tschörtnerite. The structure was reported by H. Effenberger et al. in *American Mineralogist,* Vol. 83, pp. 607–617, 1998, in which the ideal empirical formula was found to be $Ca_4 (K, Ca, Sr, Ba)_3 Cu_3 (OH)_8 [Si_{12}Al_{12} O_{48}] \cdot xH_2O, x=20$. It was also found that the crystal morphology was cubic with a=31.62 Å. Although tschortnerite has a very large cage, the largest pore openings are only single and double eight rings. Also the presence of extra-framework copper diminishes the utility of natural tschörtnerite (along with the fact that only 1 mg of tschörtnerite has been found). In view of tschörtnerite's structure, it would be desirable to prepare a synthetic version, without copper, for use in various separation processes.

SUMMARY OF THE INVENTION

As stated, the present invention relates to a crystalline zeolitic composition having a microporous framework structure containing $AlO_2$ and $SiO_2$ tetrahedral units and an empirical formula on an anhydrous and as synthesized basis in terms of molar oxide ratios of:

$$mA_{2/n}O: Al_2O_3: ySiO_2 \quad (I)$$

where A is an exchangeable cation selected from the group consisting of alkali metals, alkaline earth metals, amines, quaternary ammonium ions and mixtures thereof, "m" is the mole ratio of the oxide of A to $Al_2O_3$ and varies from about 0.8 to about 1.5, "n" is the valence of A and "y" is the mole ratio of $SiO_2$ to $Al_2O_3$, the composition characterized in that it has the crystalline structure of TSC and a cubic crystalline cell with a value of a=30 to about 33 Å.

Another embodiment is a process for separating one molecular species from a mixture of molecular species comprising contacting the mixture with the zeolitic composition described above.

A specific embodiment is separating nitrogen from air by contacting air with the above described zeolite to adsorb the nitrogen onto the zeolite.

These and other objects and embodiments will become more apparent after the detailed description of the invention.

BRIEF DESCRIPTION OF THE FIGURE

The FIGURE shows predicted $O_2$ and $N_2$ isotherms for LiTSC (2.0).

DETAILED DESCRIPTION OF THE INVENTION

The instant invention relates to a new synthetic zeolite and to separation processes using the zeolite. This zeolite is represented by the empirical formula on an anhydrous and as synthesized basis in terms of molar oxide ratios of:

$$mA_{2/n}O: Al_2O_3 : ySiO_2 \quad (I)$$

where A is an exchangeable cation, "m" is the mole fraction of A to $Al_2O_3$, "n" is the valence of A and "y" is the mole ratio of $SiO_2$ to $Al_2O_3$. Exchangeable cations of A are selected from the group consisting of alkali metals, alkaline earth metals, quaternary ammonium ions and mixtures thereof. Specific examples of the cations include, without limitation, lithium, sodium, potassium, calcium, barium, strontium and tetramethylammonium. The mole ratio "m" of A varies from about 0.80 to about 1.5, while "n" the valence of A has a value of +1 or +2. Finally, "y" which is the mole ratio of $SiO_2$ to $Al_2O_3$ varies from about 2 to about 6.

The zeolite described above may be prepared using a hydrothermal crystallization of a reaction mixture which may be prepared by combining reactive sources of aluminum, silicon, at least one A component and water. Aluminum sources include, but are not limited to, aluminum alkoxides, precipitated alumina, aluminum hydroxide, aluminum salts and aluminum metal. Specific examples of aluminum alkoxides include, but are not limited to, aluminum ortho-sec-butoxide and aluminum-ortho-isopropoxide. Sources of silica include, but are not limited to, silicate salts, tetraethylorthosilicate, fumed silicas, precipitated silicas and colloidal silica. When A is a quaternary ammonium cation, the sources include without limitation the hydroxide and halide compounds. Specific examples include without limitation tetramethylammonium hydroxide, tetraethylammonium bromide, tetrapropylammonium hydroxide. Additionally, when A is an alkali or alkaline earth metal, sources include but are not limited to the halide salts, nitrate salts, acetate salts and hydroxides of the respective alkali or alkali earth metals.

These sources described above are mixed to form a reactive mixture which can be described in terms of molar ratios of the oxides by the formula:

$$aA_{2/n}O: Al_2O_3: bSiO_2: cH_2O \quad (II)$$

where "a" is the mole ratio of the oxide of A to $Al_2O_3$ and has a value of about 0.8 to about 1.5, "b" is the mole ratio of $SiO_2$ to $Al_2O_3$ and has a value of about 2 to about 6 and "c" is the mole ratio of water to $Al_2O_3$ and has a value of about 16 to about 300. The reaction mixture can be reacted at reaction conditions including a temperature of about 60 to about 175° C. and preferably from about 90 to about 150° C. for a period of about 8 hrs to about 168 hrs and preferably for a time of about 24 hrs to about 72 hrs in a sealed reaction vessel under autogenous pressure. After crystallization is complete, the solid product can be isolated from the heterogeneous mixture by means such as filtration or centrifugation and then washed with deionized water and dried in air at ambient temperatures up to about 100° C.

The crystalline zeolites which may be obtained from the above process would have a microporous three-dimensional framework structure composed of $AlO_2$ and $SiO_2$ tetrahedral units. The microporous structure has an intracrystalline pore system with uniform pore diameters, i.e., the pore sizes are crystallographically regular. These zeolites are also characterized in that they have the crystal topology of tschörtnerite (identified by the International Zeolite Association by the three-letter code TSC). However, in contrast to the naturally occurring mineral, the present zeolite has a cell dimension (cubic cell) a from about 30 Å to about 33 Å depending on the cation present (versus 31.62 Å for the mineral). Additionally, the present zeolite is substantially free of extra framework copper.

The zeolites of this invention are capable of separating mixtures of molecular species based on the molecular size (kinetic diameter) or on the degree of polarity of the molecular species. When the separation of molecular species is based on molecular size, separation is accomplished by the smaller molecular species entering the intracrystalline void space while excluding larger species. The kinetic diameters of various molecules such as oxygen, nitrogen, carbon dioxide, carbon monoxide are provided in D. W. Breck, *Zeolite Molecular Sieves,* John Wiley and Sons (1974) p. 636.

If one of the molecular species, is a small impurity, the separation may be effected in the conventional manner by simply passing the stream to be treated through a bed of the TSC topology zeolite at temperatures of about −50° C. to about 100° C. and pressures of about 1.4 kPa to about 10,342 kPa. As the operation of the process continues, there develops in the bed a so-called "front" between the zeolite loaded with the impurity and the zeolite not so loaded. This front moves through the bed in the direction of the gas flow. Before the front reaches the downstream end of the bed, the bed is regenerated by cutting off the flow of the feed stream and passing through the bed a purge gas which (usually at a temperature of about 50°–150° C.) desorbs the impurity from the bed. If the purge gas is adsorbed on the bed, this gas can be removed by passing one or two bed volumes of the feed stream through the bed.

If the concentration of one of the species in the mixture is large, e.g., several percents, other conventional techniques, such as pressure swing adsorption (PSA) and thermal swing adsorption may be used. Such techniques are well known to those skilled in the separation art. See, e.g., U.S. Pat. No. 4,723,966 B1, U.S. Pat. No. 4,589,888 B1 and U.S. 4,398,926 B1. For example, a pressure swing adsorption process will operate at a temperature and pressure sufficient to effect the adsorption and desorption of the component or molecular species which one wants to remove. Typically the temperature is preferably maintained in the range of about −50° to 100° C. and preferably from about 0° to 50° C. The pressure during adsorption can vary from about 0.2 psia (1.4 kPa) to about 1500 psia (10,342 kPa), preferably from about 50 psia (344 kPa) to about 500 psia (3,447 kPa) and more preferably from about 75 psia (517 kPa) to about 350 psia (2,413 kPa). The pressure during desorption is lower than during adsorption and effective to cause desorption of the adsorbed component. The range of this pressure is from about 0.1 torr (1.3 Pa) to 150 psia (1,034 kPa), preferably from about 0.1 torr (1.3 Pa) to 15 psia (103 kPa) and more preferably from about 0.1 torr (1.3 Pa) to about 250 torr (333 Pa). The cyclic process can comprise additional adsorption and regeneration steps as well as intermediate depressurization and purging steps.

As shown by calculations (see the examples), the TSC zeolite of this invention is expected to have particular utility in a process for separating nitrogen from a feedgas containing other gases and in particular in separating nitrogen from oxygen in air. The process which would be used for this separation is a PSA process which is operated under conditions set forth above.

As synthesized, the zeolite will contain some of the exchangeable or charge balancing cations in its pores. These exchangeable cations can be exchanged with other cations or in the case of organic cations they can be removed by heating under controlled conditions. All of these methods are well known in the art.

As stated above the zeolites which may be obtained from the procedure set out above have a framework topology of TSC.

EXAMPLE 1

Sodium aluminosilicate may be prepared by adding one equivalent amount of a sodium silicate solution to one equivalent amount of a sodium aluminate solution, stirring and then isolating the solid product.

The sodium aluminosilicate may then be ion-exchanged with an excess of $Ca(OAc)_2$ at 50° C. to exchange the sodium for calcium. Next the calcium containing aluminosilicate solid may then be slurried with enough 1M KOH solution to give a 1:1 K/Si ratio. The slurry is homogenized, split into portions, placed in Teflon®-lined autocaves and heated to 100° C. or 125° C. for 4 days to crystallize a TSC product. The product may be isolated by filtration, washed and dried at room temperature.

EXAMPLE 2

Sodium aluminosilicate may be prepared as in Example 1. Next the solid may be exchanged with an excess of $Cu(NH_3)_4$ $(NO_3)_2$ in solution. The copper containing solid may next be slurried in an aqueous solution containing 0.5 TMAOH/Si and 0.5 NaOF/Si. This slurry is divided into two portions, placed in Teflon®-lined autoclaves and heated to 100° C. or 125° C. for 4 days to crystallize a copper containing TSC zeolite.

This CuTSC may be treated to remove the copper by contacting it with an aqueous ammonia solution (pH=10) to form a copper tetrarnine complex which may be washed out. The resulting product would be TSC with ammonium cations, tetramethyl ammonium cations and some sodium cations depending on treatment conditions.

EXAMPLE 3

Sodium aluminosilicate may be prepared as in Example 1 and then may be exchanged with Ca $(OAc)_2$, at a ratio of 0.50/Si, in solution. The calcium containing solid may now be slurried with a solution containing 0.25 Cu $(NO_3)_2$, 1.25 $NH_3$/Si, 0.5 TMAOH/Si and 0.25 NaOH/Si. This mixture is divided into portions, placed into autoclaves and the mixtures reacted at 100° C. and 125° C. for 4 days.

The calcium may be exchanged for ammonium ions by using $NH_4NO_3$. The ammonium ions can be further exchanged for other cations to obtain the desired form of the zeolite. The copper may be exchanged for ammonium ions in a manner analogous to that in Example 2.

EXAMPLE 4

The mineral form of tschörtnerite may be treated to remove the copper and some or all of the other cations. First, the mineral may be contacted with an ammonium nitrate solution at a pH=5 to exchange the alkali and alkaline earth cations for $NH^+_4$ cations. Next, this $NH^+_4$ containing TSC may be treated with an aqueous ammonia solution at a pH=10 to remove the copper.

EXAMPLE 5

A CaTSC with a $SiO_2/Al_2O_3$ of 2.0, can be prepared as per Example 3 and then the calcium exchanged for lithium using lithium chloride. Loadings for $O_2$ and $N_2$ for LiTSC (2.0) were calculated by obtaining an optimized geometry for the zeolite introducing gas molecules and then using a biased-Grand Cononical Monte Carlo technique which contains electrostatic and dispersion interactions between the gas molecules and the zeolite. The result of these calculation are plotted in the FIGURE. The capacity and selectivity of LiTSC (2.0) are between those of LiX (2.0) and LiA (2.0).

What is claimed is:

1. A crystalline zeolitic composition having a microporous framework structure containing $AlO_2$ and $SiO_2$ tetrahedral units and an empirical formula on an anhydrous and as synthesized basis in terms of molar oxide ratios of:

$$mA_{2/n}O: Al_2O_3:ySiO_2 \quad (I)$$

where A is an exchangeable cation selected from the group consisting of alkali metals, alkaline earth metals, quaternary ammonium ions and mixtures thereof, "m" is the mole ratio of the oxide of A to $Al_2O_3$ and varies from about 0.8 to about 1.5, "n" is the valence of A and "y" is the mole ratio of $SiO_2$ to $Al_2O_3$, the composition characterized in that it has the crystalline topology of TSC and has crystalline cell dimensions of a=30–33 Å.

2. The composition of claim 1 where A is an alkali metal selected form the group consisting of lithium, sodium, potassium and mixtures thereof.

3. The composition of claim 2 where the alkali metal is lithium.

4. The composition of claim 1 where A is a quaternary ammonium compound.

5. A process for separating one molecular species from a mixture of molecular species comprising contacting the mixture with an adsorbent at adsorption conditions thereby adsorbing one molecular species, the adsorbent comprising a crystalline zeolitic composition having a microporous framework structure containing $AlO_2$ and $SiO_2$ tetrahedral units and an empirical formula on an anhydrous and as synthesized basis in terms of molar oxide ratios of:

$$mA_{2/n}O: Al_2O_3:ySiO_2$$

where A is an exchangeable cation selected from the group consisting of alkali metals, alkaline earth metals, quaternary ammonium ions and mixtures thereof, "m" is the mole ratio of the oxide of A to $Al_2O_3$ and varies from about 0.8 to about 1.5, "n" is the valence of A and "y" is the mole ratio of $SiO_2$ to $Al_2O_3$, the composition characterized in that it has the crystalline topology of TSC and has crystalline cell dimensions of a=30–33 Å.

6. The process of claim 5 where the adsorption conditions comprise a temperature of about −50° C. to about 100° C., a pressure of about 1.4 kPa to about 10,342 kPa (absolute).

7. The process of claim 5 where the separation is based on the kinetic diameter of the species.

8. The process of claim 5 where the separation is based on the polarity of the species.

9. A process for separating nitrogen from a feedgas comprising contacting the feedgas with an adsorbent at adsorption condition to preferentially adsorb nitrogen onto said adsorbent, the adsorbent comprising a crystalline zeolitic composition having a microporous framework structure containing AlO, and $SiO_2$ tetrahedral units and an empirical formula on an anhydrous and as synthesized basis in terms of molar oxide ratios of:

$$mA_{2/n}O: Al_2O_3 : ySiO_2 \quad (II)$$

where A is an exchangeable cation selected from the group consisting of alkali metals, alkaline earth metals, amines, quaternary ammonium ions and mixtures thereof, "m" is the mole ratio of the oxide of A to $Al_2O_3$ and varies from about 0.8 to about 1.5, "n" is the valence of A and "y" is the mole ratio of $SiO_2$ to $Al_2O_3$, the composition characterized in that it has the crystalline topology of TSC and has crystalline cell dimensions of a=30–33 Å.

10. The process of claim 9 where the feedgas is air.

11. The process of claim 9 where A is lithium.

12. The process of claim 9 where the adsorption conditions comprise a temperature of about −50° C. to about 100° C., a pressure of about 1.4 kPa to about 10,342 kPa.

* * * * *